US008204942B2

(12) United States Patent
Roskind et al.

(10) Patent No.: US 8,204,942 B2
(45) Date of Patent: Jun. 19, 2012

(54) INTELLIGENT PROCESSING IN THE CONTEXT OF AWAY AND OFFLINE INSTANT MESSAGES

(75) Inventors: James A. Roskind, Redwood City, CA (US); Gagan Saksena, Sunnyvale, CA (US)

(73) Assignee: AOL Inc., Dulles, VA (US)

( * ) Notice: Subject to any disclaimer, the term of this patent is extended or adjusted under 35 U.S.C. 154(b) by 1172 days.

(21) Appl. No.: 11/549,940

(22) Filed: Oct. 16, 2006

(65) Prior Publication Data

US 2007/0130277 A1  Jun. 7, 2007

Related U.S. Application Data

(63) Continuation of application No. 10/608,438, filed on Jun. 30, 2003, now Pat. No. 7,124,123.

(51) Int. Cl.
*G06F 15/16* (2006.01)
*G06F 15/173* (2006.01)

(52) U.S. Cl. ............... 709/206; 709/204; 709/223

(58) Field of Classification Search .......... 709/206, 709/204, 207, 223; 345/758
See application file for complete search history.

(56) References Cited

U.S. PATENT DOCUMENTS

| | | | |
|---|---|---|---|
| 6,260,148 B1 | 7/2001 | Aggarwal et al. | |
| 6,430,602 B1 | 8/2002 | Kay et al. | |
| 6,640,230 B1 | 10/2003 | Alexander et al. | |
| 6,988,128 B1 * | 1/2006 | Alexander et al. | 709/206 |
| 7,035,865 B2 | 4/2006 | Doss et al. | |
| 7,334,021 B1 * | 2/2008 | Fletcher | 709/206 |
| 2001/0042126 A1 | 11/2001 | Wong et al. | |
| 2002/0015166 A1 * | 2/2002 | Wakai et al. | 358/1.11 |
| 2002/0024947 A1 | 2/2002 | Luzzatti et al. | |
| 2002/0103917 A1 | 8/2002 | Kay et al. | |
| 2002/0143916 A1 * | 10/2002 | Mendiola et al. | 709/223 |
| 2002/0178226 A1 * | 11/2002 | Anderson et al. | 709/206 |
| 2003/0002445 A1 | 1/2003 | Fullana et al. | |
| 2003/0018724 A1 * | 1/2003 | Mathewson et al. | 709/206 |
| 2003/0018726 A1 | 1/2003 | Low et al. | |
| 2003/0055908 A1 * | 3/2003 | Brown et al. | 709/207 |
| 2003/0074410 A1 * | 4/2003 | Kay et al. | 709/206 |
| 2003/0182391 A1 * | 9/2003 | Leber et al. | 709/217 |
| 2004/0024822 A1 * | 2/2004 | Werndorfer et al. | 709/206 |
| 2004/0082317 A1 * | 4/2004 | Graefen | 455/413 |
| 2004/0148346 A1 * | 7/2004 | Weaver et al. | 709/204 |
| 2004/0179039 A1 * | 9/2004 | Blattner et al. | 345/758 |
| 2005/0004984 A1 | 1/2005 | Simpson | |
| 2005/0044144 A1 | 2/2005 | Malik et al. | |

OTHER PUBLICATIONS

CNN.com-Technology—Is your new AIM pal an artificial intelligence program? Augu . . . ; http://www.cnn.com/2000/TECH/computing/08/29/aoliza.idg/; Jan. 23, 2003.
InStantage Messaging Planet: Wireless IM; http://www.instantmessagingplanet.com/wireless/print.php/1547321; Jan. 23, 2003.
"Demoable DingBots," Activerse Internal Webpage Describing Bots Available on the Activerse Bot Server, Jun. 30, 1999.

* cited by examiner

*Primary Examiner* — Aaron Strange
(74) *Attorney, Agent, or Firm* — Finnegan, Henderson, Farabow, Garrett & Dunner LLP

(57) ABSTRACT

An electronic assistant handles instant messages sent to a user when the user is away or offline. The electronic assistant may respond intelligently and helpfully to inquiries regarding the user's away or offline status, may take messages for delivery to the away or offline user, and may intelligently forward messages to the user, as appropriate.

11 Claims, 9 Drawing Sheets

INTELLIGENT PROCESSING IN THE CONTEXT OF AWAY AND OFFLINE INSTANT MESSAGES

CROSS-REFERENCE TO RELATED APPLICATIONS

This application is a continuation of U.S. patent application Ser. No. 10/608,438, filed on Jun. 30, 2003, and titled INTELLIGENT PROCESSING IN THE CONTEXT OF AWAY AND OFFLINE INSTANT MESSAGES, which is hereby incorporated by reference.

TECHNICAL FIELD

This description relates to the handling of away or offline scenarios in an instant messaging environment.

BACKGROUND with the advent of the Internet and a decline in computer prices, many people are communicating with one another through computers interconnected by networks. A number of different communications programs have been developed to facilitate such communications between computer users. Instant messaging (IM) programs are one type of communication program. IM programs typically have a user interface that presents representations of user selected buddies (i.e., other users of the IM program that have been selected by the user). When a buddy's instant messaging program is connected to the network and the buddy is available, a user may manipulate the user interface to initiate instant messaging communications with the buddy. For example, the user may use the IM program to engage in a real-time textual messaging session with the buddy identified using the instant messaging user interface.

At times, a user may be away from his or her computer or otherwise unavailable to engage in communications with a buddy, even though his or her instant messaging program is connected to the network or otherwise available for communications. In such a situation, a user typically is considered to be "away." Traditionally, some IM client programs have allowed users to configure preset "away messages" that are went as textual messages to buddies that attempt to communicate with the user while the user is away. When a buddy sends an instant message to the away user, the user's instant messaging program responds with the preset message, thereby alerting the buddy that the user is away. The instant message sent to the away user may be displayed on the client system running the instant message program so that the away user may view the message when the user returns to that client system.

A user also may be unavailable because his or her instant messaging program is not connected to the network. In such a situation, a user typically is considered to be "offline." While some instant messaging programs provide no way of sending messages to a buddy in this situation, others (e.g., ICQ) allow messages to an offline buddy to be stored at a server and delivered to the user when he or she later comes online (i.e., when he or she connects the IM client program to the network).

SUMMARY

In one general aspect, an instant messaging system includes an electronic assistant to handle instant messages sent from a first user to an instant message program of a second user when the second user is away or offline. The assistant receives a first instant message from the first user. In response to the first instant message, the assistant sends the first user an instant message that indicates the second user is away or offline. The assistant then receives a second instant message from the first user that contains a request that the electronic assistant take an action related to the away or offline status of the second user. In response to the request, the assistant takes the requested action.

In another general aspect, an electronic assistant that handles instant messages sent from a first user to an instant message program of a second user when the second user is away or offline may include a natural language interface component and a response component. The natural language interface component processes an instant message to determine if the instant message is requesting that the electronic assistant take an action related to the away or offline status of the second user. The response component generates and sends a response to an instant message requesting that the electronic assistant take an action related to the away or offline status of the second user. The response is related to the requested action.

Implementations of the foregoing may include one or more of the following features. For example, the requested action may include providing the first user with information about the away or offline status of the second user, and the assistant may send a response to the first user that includes information related to the away or offline status of the second user. The information related to the away or offline user may be determined by accessing information about the recent history of the away and/or offline status of the second user, stored calendar information of the second user, and/or information about other ways of contacting the second user. The information provided to the first user that relates to the second user's away or offline status may be based, at least in part, on whether the first user is trusted and the extent to which the first user is trusted.

The requested action may include taking a message from the first user for delivery to the second user. The message taken then may be forwarded to the second user. Where and when the message is forwarded may be based on information about the recent history of the away and/or offline status of the second user, stored calendar information of the second user, and/or information about other ways of contacting the second user. Where and when the message is forwarded also may be based on whether the first user is trusted and the extent to which the first user is trusted.

In another general aspect, instant messages sent to an away or offline user from a first user are received and, in response to at least one of the instant messages requesting information related to the away or offline status of the away or offline user, information related to the away or offline status of the away or offline user is provided to the first user. In addition, a message left by the first user for delivery to the away or offline user is received and a determination is made as to when and where the message should be forwarded for the away or offline user to receive the message. The message then is forwarded according to the determination.

Implementations may include one or more of the following features. For example, the information provided to the first user may be based on whether the first user is trusted, information about the recent history of the away and/or offline status of the away or offline user, stored calendar information of the away or offline user, and/or information about other ways of contacting the away or offline user. Similarly, the message may be forwarded based on one or more of the same criteria.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

In one general aspect, an electronic assistant handles instant messages sent to a user when the user is away or offline. The electronic assistant may respond intelligently and helpfully to inquiries regarding the user's away or offline status, may take messages for delivery to the away or offline user, and may intelligently forward messages to the user, as appropriate.

Figure 1:
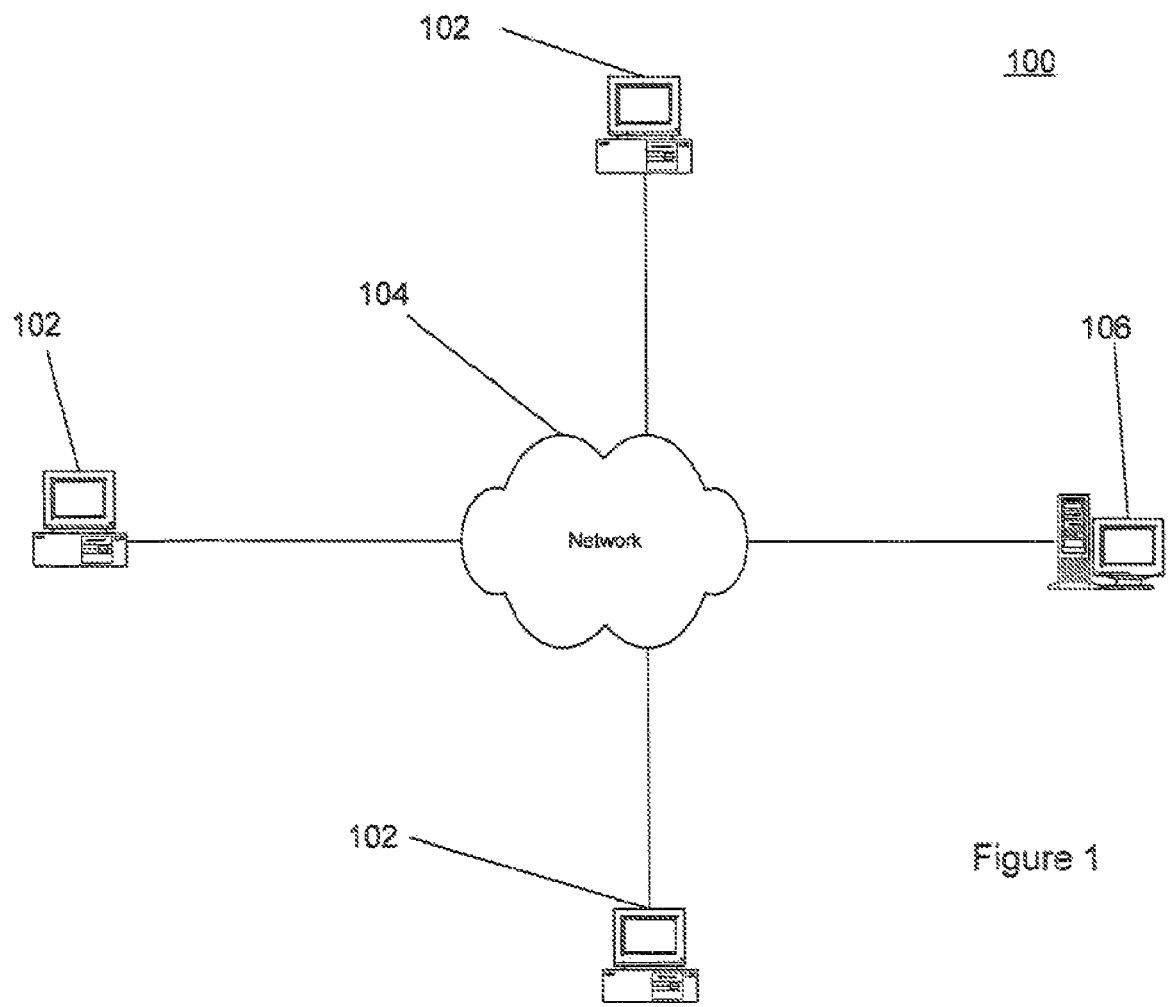
FIG. 1 is a diagram showing an exemplary networked computing environment.

FIG. 1 illustrates an exemplary networked computing environment 100 in which an electronic assistant for instant messages may be used. Computer users are distributed geographically and communicate using client systems 102 interconnected by a network 104. Client systems 102 are connected to network 104 through various communication mediums, such as modem connected to a telephone line (using, for example, serial line internet protocol (SLIP) or point-to-point protocol (PPP) or a direct internetwork connection (using, for example, transmission control protocol/internet protocol (TCP/IP)). A host server 106 also may be connected to network 104 and may be used to facilitate some direct or indirect communications between client systems 102.

Each client system 102 and host server 106 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 102 and host server 106 may receive instructions from, for example, a software application, a program, a piece of code, a device, a computer, a computer system, or a combination thereof, which independently or collectively direct operations. These instructions may take the form of one or more communications programs that facilitate communications between the users of client systems 102. Such communications programs may include, for example, electronic mail (e-mail) programs, IM programs, file transfer protocol (FTP) programs, or voice-over-IP (VoIP) programs. The instructions may be embodied permanently or temporarily in any type of machine, component, equipment, storage medium, or propagated signal that is capable of being delivered to a client system 102 or the host server 106.

Each client system 102 and the host server 106 includes a communications interface (not shown) used by the communications programs to send communications through network 104. The communications may include e-mail, audio data, video data, general binary data, or text data (e.g., data encoded in American Standard Code for Information Interchange (ASCII) format).

Examples of network 104 include the Internet, Wide Area networks (WANs), Local Area Networks (LANs), analog or digital wired and wireless telephone networks (e.g., a Public Switched Telephone Network (PSTN)), an Integrated Services Digital Network (ISDN), or a Digital Subscriber Line (xDSL)), or any other wired or wireless network. Network 104 may include multiple networks or subnetworks, each of which may include, for example, a wired or wireless data pathway.

Instant messaging client programs (executing on clients 102, for example) may use an instant messaging server to assist in communications between users. The instant messaging server may be implemented, for example, using host server 106. When a user is connected to the network and executes the instant messaging client program, the instant messaging client program contacts host server 106 and logs the user onto host server 106. Host server 106 may inform the instant messaging client program when the program user's buddies are online and may facilitate communications between the program user and a buddy. Thus, once logged on to host server 106, a user may use the IM client program to view whether particular buddies are online, to exchange IMs with particular buddies, to participate in group chat rooms, or to trade files such as pictures, invitations or documents. The program user also may be able to find other buddies with similar interests, get customized information such as news and stock quotes, and search the World Wide Web.

Host server 106 may support IM services irrespective of a program user's network or Internet access. Thus, host server 106 may allow users to send and receive IMs, regardless of whether they have access to any particular Internet service provider (ISP). Host server 106 also may support associated services, such as administrative matters, advertising, directory services, chat, and interest groups related to IM. To transfer data, host server 106 employs one or more standard or proprietary IM protocols.

Host server 106 may assist IM communications between users of IM client programs by facilitating the establishment of a peer-to-peer communication session between the IM client programs. Host server 106 also may execute instant message routing software that assists IM communications by directly routing communications between the IM client programs.

Figure 2A:
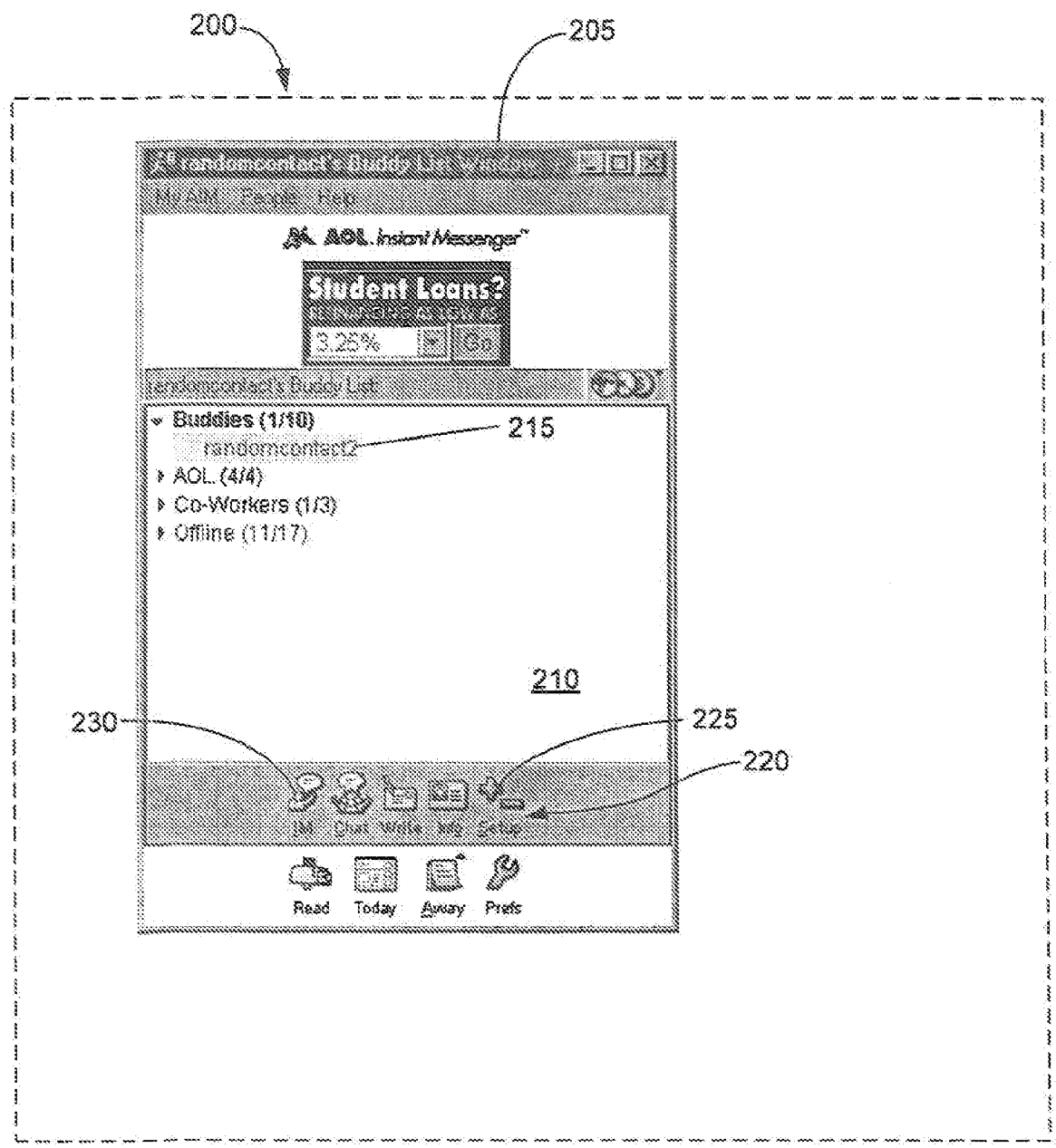
FIG. 2A is an illustration showing an exemplary interface presented to a user when an instant messaging client program is executing on a client system.

FIG. 2A illustrates an exemplary interface presented to a user when an instant messaging client program is running on one of client systems 102. Instant messaging programs typically allow users to communicate in real-time with each other in a variety of ways. For example, many instant messaging programs allow users to send text as an instant message, to transfer files, and to communicate by voice. Examples of IM client programs include AIM (America Online Instant Messenger), AOL (America Online) Instant Messaging, Yahoo Messenger, MSN Messenger, and ICQ.

FIG. 2A shows a desktop 200 with a user interface 205 of the instant messaging client program. User interface 205 has a text box 210 that displays representations 215 of the program user's buddies, which are other identities registered with and able to be leveraged using an instant messaging program. Representations 215 may provide contextual information to the program user about the buddy, such as whether the buddy is online, how long the buddy has been online, whether the buddy is away, or whether the buddy is using a mobile device.

The list of buddies displayed in text box 210 of user interface 205 typically is referred to as the buddy list. The program user typically can add or remove buddies from the buddy list.

User interface 205 may have icons 220 to help a user set various options or perform operations in the instant messaging program. By selecting a "setup" icon 225, for example, the program user can invoke a window (not shown) that allows for manual addition or removal of buddies from the buddy list. Some icons 220 also may assist in initiating communications or interactions. An "IM" icon 230, for instance, may be used as a way to initiate instant messages. For instance, the program user can highlight the representation of a buddy, and initiate an instant message with that buddy by selecting "IM" icon 230.

Figure 2B:
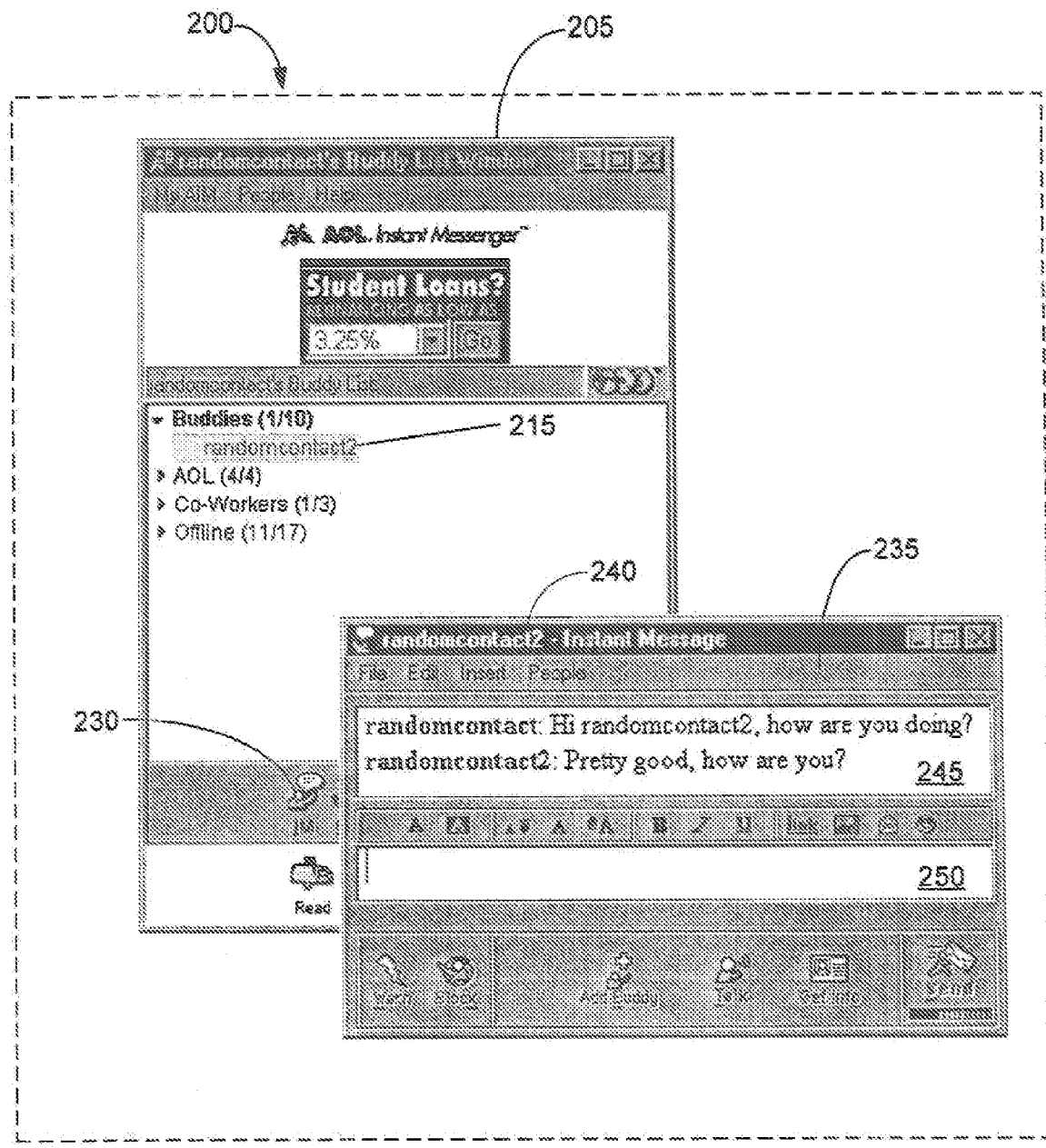
FIG. 2B is an illustration showing an exemplary instant messaging window presented when a user is engaged in an instant message session with a buddy.

FIG. 2B illustrates an exemplary instant messaging window 235 presented when a user is engaged in a textual instant message session with a buddy. Window 235 may be invoked when a program user initiates an instant message session, for example, by double-clicking on a buddy's representation 215 or by using "IM" icon 230. Window 235 includes a titlebar 240, in which the buddy's screenname (e.g., "randomcontact2") is shown. Window 235 also includes a text box 245 and an edit box 250. A similar window is displayed on the buddy's client system.

The typed messages of the user and buddy are displayed in text box 245. The user's or buddy's screennames may be listed beside their corresponding messages in text box 245. For instance, in the exemplary window shown, the user (whose screen name is "randomcontact") has type and sent the message "Hi randomcontact2, how are you doing?" to the buddy (whose screenname is "randomcontact2"). The buddy has replied with the message "Pretty good, how are you?". To send a message, the user types the message in edit box 250 and activates a send command, for example, by pressing an ENTER key. In response, the entered text is displayed in text box 245 and in the text box of the similar window displayed on the buddy's client system.

Figure 3:
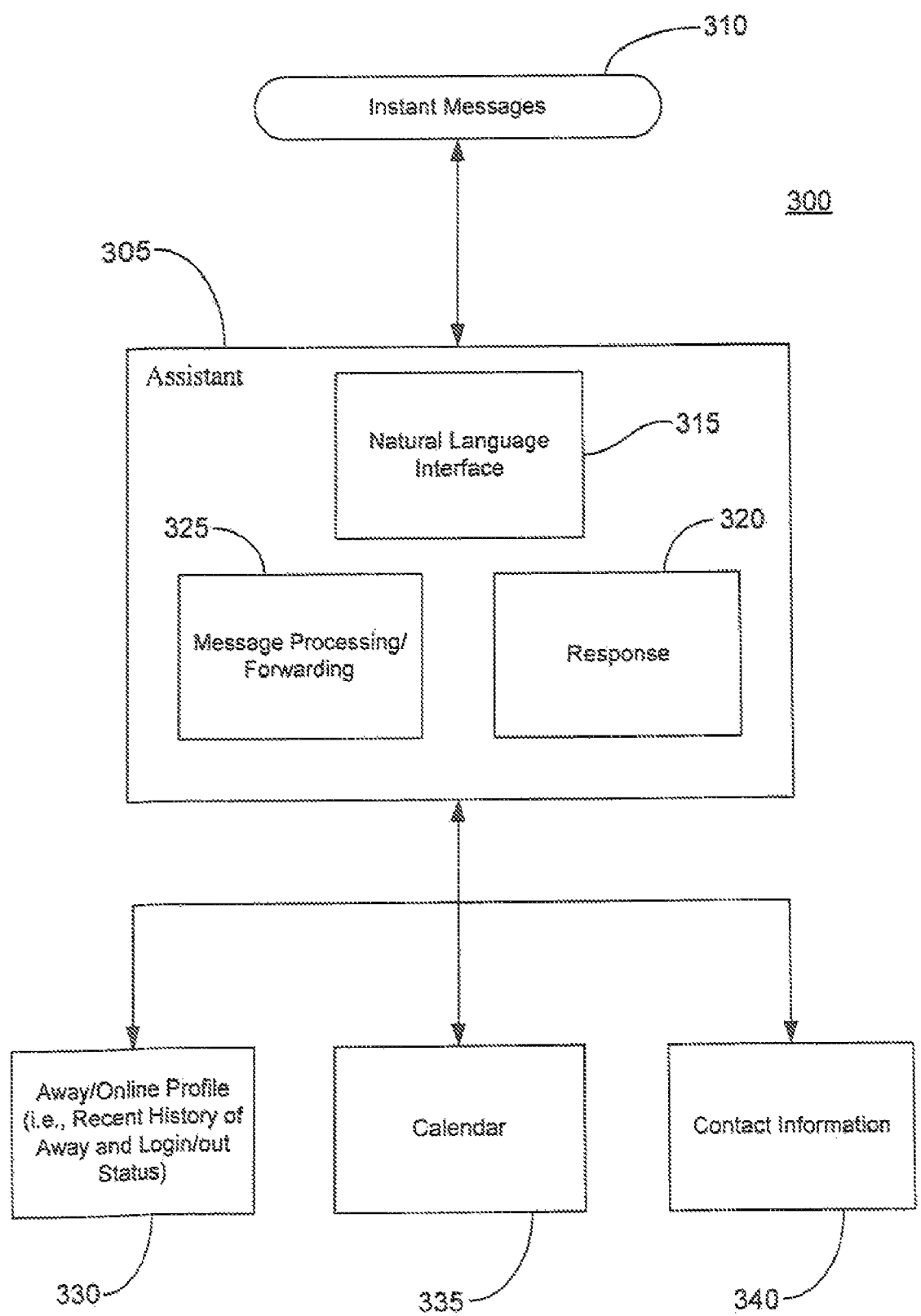
FIG. 3 is a block diagram of a system that provides for intelligently handling instant messages when a user is away and/or offline.

FIG. 3 is a block diagram of a system 300 that provides for intelligently handling instant messages when a user is away and/or offline. The system 300 includes an electronic assistant 305 that handles instant messages 310 sent to an instant messaging program of a user that is away or offline (the "intended recipient" or "away user"). Instant messages 310 may be text-based, audio-based, video-based, graphics-based, or any combination thereof. Assistant 305 is connected to network 104 such that instant messages sent from a contacting user or message initiator to the intended recipient's IM client program are routed to assistant 305 when the user is away and/or offline. In any given implementation, exactly how and where assistant 305 is connected to network 104 may depend on the instant messaging infrastructure, along with particular design considerations (e.g., whether assistant 305 should be available when a user is offline, as opposed to only being available when a user is away).

In general, and referring also to FIG. 1, assistant 305 may be implemented on host system 106, a second server system (not shown), or a client system 102 (including the client system executing the intended recipient's IM client program). For example, when host server 106 is used to directly route instant messages 310 between IM client programs, assistant 305 may reside and execute on host server 106 or another system connected to host server 106. Host server 106 may initially receive instant messages 310 and the instant message routing software executing on host server 106 then may pass instant messages 310 to assistant 305 when a user is away and/or offline. Alternatively, assistant 305 may initially receive instant messages 310 and then pass instant messages 310 to host server 106 when instant messages 310 need to be routed to a user's IM client program. As another alternative, the IM infrastructure may be such that instant messages are received both by the instant message routing software and assistant 305 at substantially the same time. In the latter case, if assistant 305 is executing on a system other than host server 106, a connection between the system on which assistant 305 is executing and host server 106 may not be needed.

When host server 106 is used to facilitate peer-to-peer connections between IM client programs, assistant 305 may reside on any server or client system. Host server 106 then may facilitate a direct connection between the buddy's IM client program and assistant 305 when the user is away and/or offline.

In other implementations, assistant 305 may execute on the intended recipient's client system or on a system connected to the intended recipient's client system. Assistant 305 then may communicate with the intended recipient's IM client program to obtain instant messages 310 communicated to the IM client program when the user is away, regardless of whether instant messages are transmitted using a peer-to-peer connection, routed to IM client program by host server 106, or processed without involving host server 106.

Assistant 305 may be integrated with the intended recipient's IM client program or other software, may be a "plug-in" to the IM client program or other software, or may be a stand-alone application. Assistant 305 also may be implemented as a so-called "software bot." However, assistant 305 is not limited to any particular hardware or software configuration. Rather, assistant 305 may be implemented using hardware, software, or a combination of both.

There may be a large number of assistants similar to assistant 305 connected to network 104, where each assistant is paired with a particular away user. Each assistant then intelligently handles instant messages received from message initiators trying to contact the away user paired with the particular assistant.

When a user is away or offline, assistant 305 responds helpfully and intelligently to one or more distinct message initiators who attempt to communicate with an unavailable intended recipient through the intended recipient's IM client program. Assistant 305 may provide message initiators with information related to the intended recipient's away or offline status, may take messages from message initiators, and may intelligently forward or route the messages to the intended recipient.

To that end, assistant 305 includes a natural language interface component 315, a response component 320, and a message processing/routing component 325. Natural language interface component 315 receives instant messages 310 routed to assistant 305 and performs natural language processing on instant messages 310. Natural language processing is performed to determine if an instant message includes a request for assistant 305 to take an action related to the intended recipient's away or offline status. Such requested actions may include, for example, providing information about the intended recipient's away or offline status, taking a message to be delivered to the intended recipient, or providing information about how to leave a message to be delivered to the intended recipient. The natural language processing may identify/determine implicit requests (e.g., "Can I leave a message?"—which implies a request for assistant 305 to provide information as to how to leave a message), in addition to explicit requests (e.g., "Please provide me with information bout how to leave a message."). Natural language processing also may determine whether the instant message is directed to a topic other than the intended recipient's away or offline status or is a more customary instant message, such as a greeting.

Any appropriate natural language processing techniques may be used to implement natural language interface 315. For example, pattern recognition, syntactically driven parsing, semantic grammars, or case frame instantiation may be used. Natural language interface 315 may recognize whole English words or phrases, and additionally may recognize phrases known to equate with particular phrases. For example, the phrase "ayt" may be a well-recognized abbreviation for the phrase "Are you there?" Natural language interface 315 may include processing for recognizing such phrases or abbreviations and taking action in response.

Response component 320 determines the appropriate response to instant messages that ask assistant 305 to take action related to the intended recipient's away or offline status. For example, response component 320 may determine the appropriate informational response to instant messages that ask assistant 305 to provide information concerning the intended recipient's away or offline status. Instant messages that ask assistant 305 to provide such information may include, for example, inquiries into whether the intended recipient is available, how long the intended recipient has been away or offline, when the intended recipient is expected to be back, when the intended recipient is generally available, whether the intended recipient can be contacted in another way, and what is the intended recipient's other buddy information.

To formulate intelligent responses to instant messages requesting information concerning the intended recipient's away or offline status, assistant 305 may have access to stored information about the intended recipient's recent history of away and/or offline status 330, the intended recipient's calendar 335, and contact information 340 for recipient. The information about the intended recipient's recent history of away and/or offline status 330 may include, for example, how long the intended recipient typically is away or offline, when the user normally is away or offline, where (e.g., home computer, work computer, mobile device) and when the intended recipient normally comes online, when the intended recipient normally goes offline, and how long the intended recipient already has been away or offline. This information may be explicitly input by the user, or this information may be passively noticed by assistant 305 and stored in as part of the information about the recipient's recent history of away and/or offline status. For example, assistant 305 may passively notice that the intended recipient normally logs out around the same time every day during the week and does not log in until the next day. Once assistant 305 determines this pattern, assistant 305 may store this information and then use it at a later time to respond to instant messages requesting information concerning the intended recipient's away or offline status. For instance, if an instant message asks for information about when the intended recipient is expected back, and the instant message is received after the intended recipient normally logs out for the day, assistant 305 may respond by indicating the intended recipient is normally logged out for the day at this time and isn't expected to log back in until the next day.

Other information about the intended recipient's online habits may be passively noticed by assistant and stored in the recent history information 330 or elsewhere. For example, assistant 305 may notice that the intended recipient normally checks e-mail about an hour after he or she logs off the instant messaging network. If an instant message is received soon after the intended recipient logs off and asks assistant 305 whether the intended recipient will receive a recently sent e-mail, assistant may respond by indicating that the intended recipient is likely going to see the e-mail because the recipient typically checks e-mail about an hour after logging off the instant messaging network.

Examples of other information that may be passively monitored includes the following. The times a user has logged in and logged out over a previous period of time (sometimes as short as hours, or days, or even over periods of months, and taking into account days of the week as well). When the user last sent an email (e.g., to deduce that recent email might be getting read). When the intended recipient typically reads and sends emails. When the user typically checks for messages. Travel reservations, for example, arranged by or otherwise mentioned in the intended recipient's email.

Calendar information 335 may include such items as meetings, vacation times, and other events. Similarly to the recent history information 330, some calendar information 335 may be explicitly input by the user, while other calendar information may be passively noticed by assistant 305 and stored as part of calendar information 335. For example, invitations sent by e-mail may be observed by assistant 305 and automatically calendared. The other contact information 340 may include, for example, phone numbers (including a cellular telephone number), electronic mail (e-mail) addresses, and mailing addresses.

Response component 320 also may determine the appropriate response to instant messages requesting that the assistant 305 take a message or provide information about how to leave a message. Such responses may include, for instance, acknowledgements of certain actions (e.g., acknowledgements that a message will be delivered to the intended recipient or that the assistant 305 is ready to take a message), or general information responses (e.g., responses indicating that a message may be left for the intended recipient and how the message may be left).

Response component 320 also may provide responses to instant messages directed to items other than a requested action. For example, if an instant message is directed to a topic other than the intended recipient's away or offline status, then response component 320 may formulate a response indicating that assistant 305 can only respond to instant messages regarding the intended recipient's away or offline status (if assistant 305 is not designed for responding to other topics). Response component 320 also may formulate some customary response, such as greetings.

Response component 320 may be implemented using appropriate artificial intelligence or machine learning algorithms or techniques (e.g., lazy learning or probabilistic reasoning). To respond to an instant message requesting information regarding the intended recipient's away or offline status, response component 320 may access the sources of information 330, 335, and 340 and apply the appropriate learning algorithms to determine the appropriate answer or response. Response component 320 then sends the response as an instant message to the message initiator making the request. Other communication mechanisms (e.g., e-mail) may be used alternatively, or in addition, to send the response.

Assistant 305 may offer to "take" a message from the message initiator for delivery to the intended recipient. The message initiator may leave the message with assistant 305 by sending assistant 305 an instant message or by sending assistant 305 the message through another communication mechanism (e.g., e-mail or a separate VoIP program). Once assistant 305 takes a message, assistant 30 may forward the message to the intended recipient through an appropriate communication medium. For example, the message may be held and then forwarded to the next system at which the intended recipient comes online, sent to the intended recipient's e-mail box (and possibly retracted if the intended recipient gets the message in another way), or sent to the intended recipient in an audio format over a telephone (or cellular phone).

Message processing/routing component 325 handles the forwarding of messages to the intended recipient. Once a message initiator deposits a message for the intended recipient (e.g., after the message has been received by the assistant 305), message processing component 325 determines when and to where the message should be forwarded (if at all) and causes the message to be forwarded appropriately.

when and to where a message is forwarded may be based on pre-configured settings, the medium over which the message is sent to assistant 305, and/or other factors such as the urgency of the message and the next likely place the intended recipient will be available or otherwise capable of receiving the message. To determine where and when to forward the message, message processing component 325 may access and use information 330, 335, and/or 340. For example, message processing component 325 may use the recent history of away and/or offline status 330 to determine if the intended recipient is likely to be available on the instant messaging system relatively soon and, if not, to forward the message to the intended recipient's e-mail address. Conversely, the message processing component 325 may determine from recent history 330 that the intended recipient is likely to be available on the instant messaging system relatively soon and hold onto the message to deliver the message using the instant messaging system when the intended recipient logs in or comes back from being away. If, for instance, the message initiator has indicated the message is urgent and the intended recipient is not likely to be available online for a while, message processing component 325 may use other contact information 340 to retrieve the intended recipient's cellular telephone number and call the intended recipient on his or her cellular phone.

The intended recipient may be able to set configurations to indicate where and when the intended recipient can or can not be contacted. For example, the intended recipient may indicate that he or she can only be contacted by cellular phone in the event of an emergency.

Figure 4:
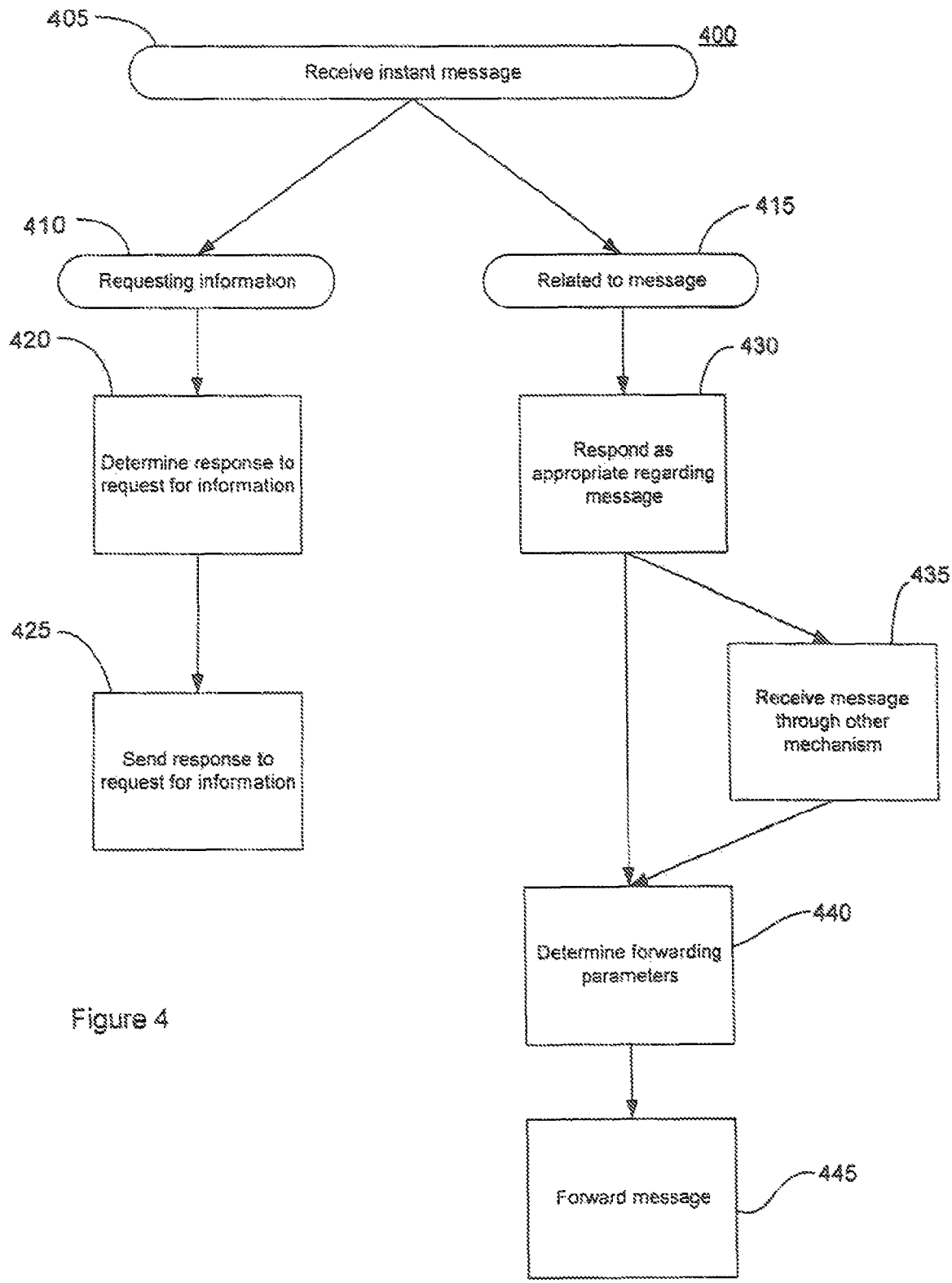
FIG. 4 is a flow-chart illustrating exemplary aspects of the operation of the assistant shown in FIG. 3.

FIG. 4 is a flow-chart 400 illustrating exemplary aspects of the operation of assistant 305. When an instant message is received (405), natural language interface 315 performs processing on the instant message to determine whether the instant message contains a request for information related to the intended recipient's away or offline status (410) or if the instant message is related to leaving a message for the intended recipient (415).

If the instant message contains a request for information related to the intended recipient's away or offline status (410), then response component 320 determines the appropriate response to the request (420). If necessary, response component 320 accesses information resources 330, 335, and/or 340 to determine the appropriate response to the request for information. For instance, if the message initiator asks when the intended recipient will be back, then response component 320 may access history information 330 to determine when the intended recipient is likely to be back. However, assistant 305 may respond to inquiries regarding other ways of contacting the intended recipient with an indication that assistant 305 can take a message. In this case, response component 320 would not need to access information sources 330, 335 and/or 340 to determine the appropriate response. Once the appropriate response is determined, the response is sent to the message initiator (425).

If the received instant message is related to a message being left for the intended recipient (415) (e.g., the instant message indicates that a message is going to be left, the instant message contains the message, or the instant message indicates the message initiator wants to leave a voice message), then response component 320 responds appropriately (430).

Appropriate responses tend to vary based on the received instant message. For example, in response to an instant message asking whether the message initiator wishes to leave a message, response component 320 may send a response indicating its ability to receive a message from the message initiator and describing how the message initiator may deposit such a message. In response to an instant message indicating that the message initiator wants to leave a message (which message may be contained in an instant message communicated by the message initiator), response component 320 may send a response indicating that the assistant 305 is waiting to record the message (or that the previously communicated instant message will be stored as the message from the message initiator).

In response to an instant message indicating that the message initiator wants to leave a message using another communication mechanism, such as e-mail or a separate VoIP program, response component 320 may send a response indicating that assistant 305 is ready to accept the message through the other mechanism or that the other mechanism is unavailable. If the message is going to be left through another mechanism, message processing component 325 may handle receiving the message through the other mechanism (435). Alternatively, aspects of assistant 305 other than message processing component 325 may alternatively or additionally be used to handle messages left through another mechanism and then may pass the message to message component 325 Those or other aspects of assistant 305 alternatively may store the message in a manner accessible to message component 325 and indicate to message component 325 that the message needs to be handled.

In response to an instant message that contains the message being left by the message initiator, response component 320 may send a response acknowledging that the message has been or will be delivered to the intended recipient. If the received instant message contains the message being left by the message initiator, natural language interface component 315 passes the instant message to message processing component 325. Alternatively, the message may be stored in a manner accessible to message component 325 and the need to handle the received message may be indicated to message component 325.

Once the message is received, message processing component 325 determines the message's forwarding parameters (e.g., if the message should be forwarded and the forwarding location and timing, as described with respect to FIG. 3) (440). Message processing component 325 then causes the message to be forwarded as appropriate (445).

Assistant 305 may take messages through one communication mechanism and deliver them through another mechanism. For example, assistant 305 may take a message through an instant message and forward the message to the intended recipient through e-mail. Assistant 305 may accept a voice message and then forward the message to the intended recipient as an e-mail or instant message either in a voice message format (e.g., as an attachment to an e-mail) or as text after performing a speech-to-text translation on the voice message. As another example, assistant 305 may take a message as an e-mail, perform a text-to-speech translation, and forward the message to the intended recipient as a voice mail.

FIGS. 5A-5D show an instant messaging window 535 that illustrate various exemplary interactions between a message initiator and an intended recipient's electronic assistant. As with window 235, window 535 includes a titlebar 540, in which the buddy's screenname ("randomcontact") is shown. Window 535 also includes a text box 545, in which type messages appear, and an edit box 250, in which the user types messages to be sent to the buddy or buddy's electronic assistant.

Figure 5A:
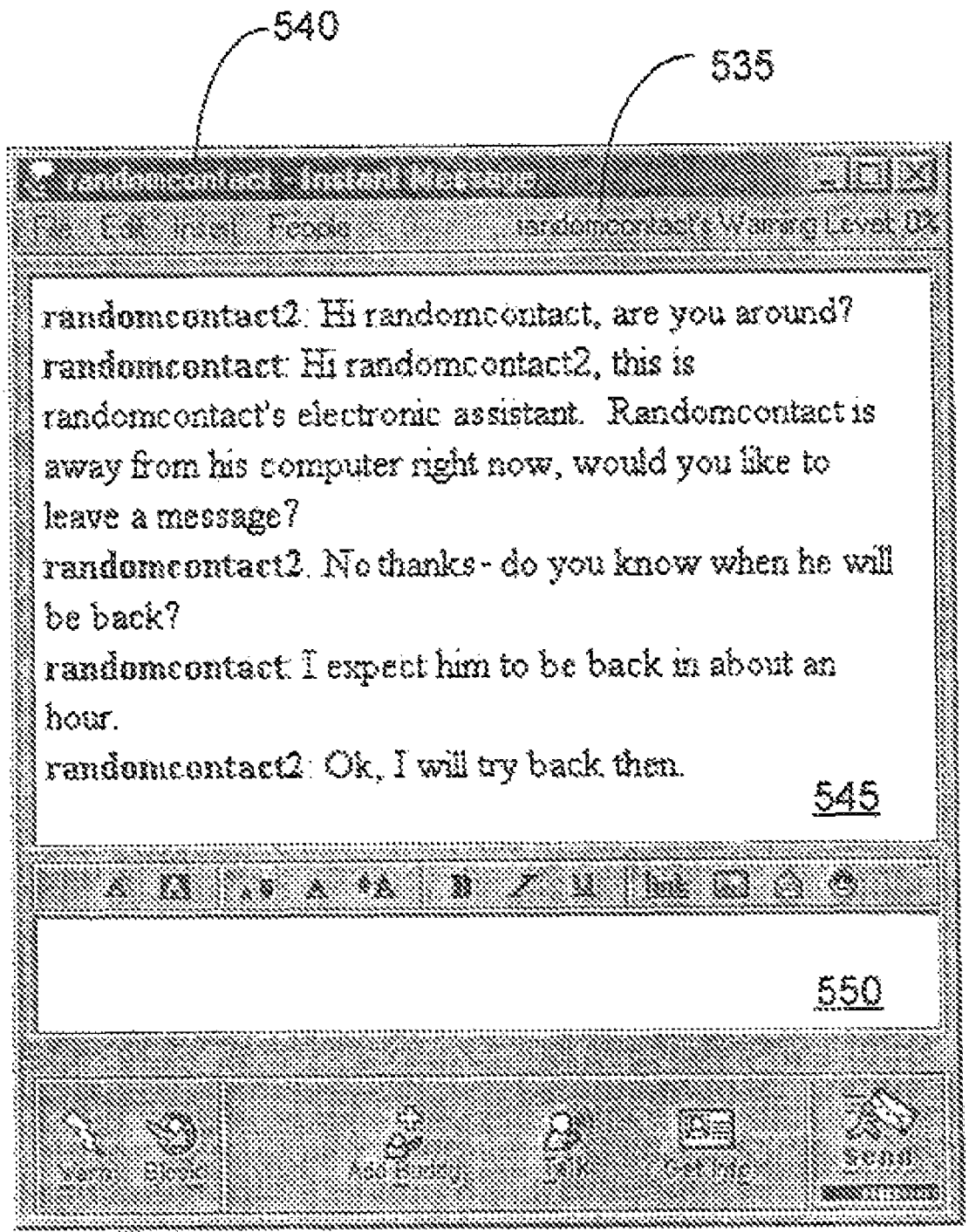
FIGS. 5A-5D are illustrations showing an instant messaging window with various exemplary interactions between a user and a buddy's electronic assistant.

Referring to FIG. 5A, the message initiator ("randomcontact2") sent an instant message to randomcontact say "Hi randomcontact, are you around?" Because randomcontact was away, randomcontact's assistant responded with "Hi randomcontact2, this is randomcontact's electronic assistant. Randomcontact is away from his computer right now, would you like to leave a message?" Randomcontact2 responded with "No thanks—do you know when he will be back?"

This instant message from randomcontact2 was received (405) and processed by natural language interface component 315. Natural language interface component 315 determined that this instant message contained a request for information regarding randomcontact's away or offline status.

In response, response component 320 determined the appropriate response (420) by accessing randomcontact's recent away or offline history to determine that randomcontact will likely be back in about an hour. Response component 320 then sent a response (425) to randomcontact2 indicating this: "I expect him back in about an hour." Randomcontact2 responded with a message stating "Ok, I will try back then."

Figure 5B:
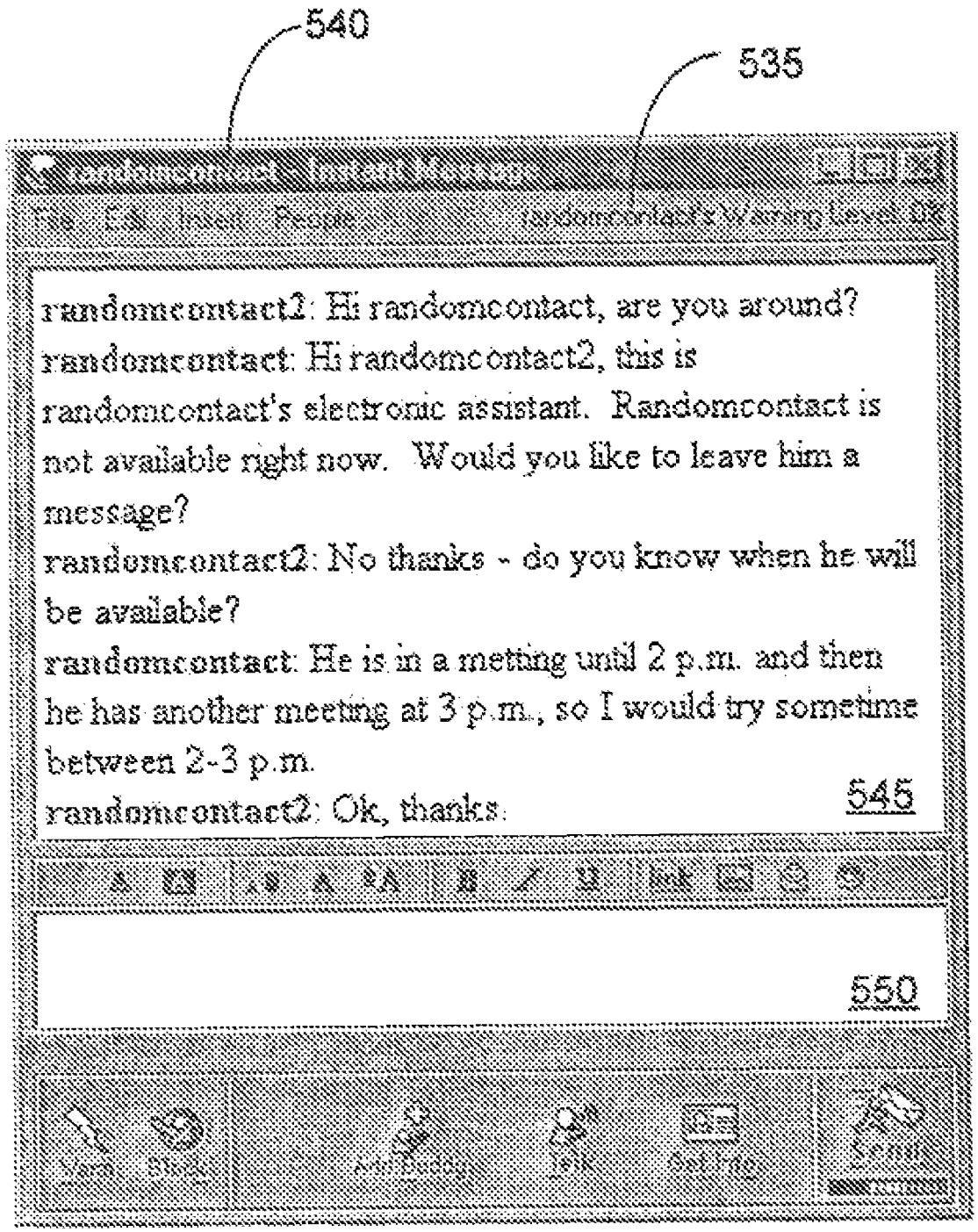

Referring to FIG. 5B, randomcontact2 sent an instant message to randomcontact saying "Hi randomcontact, are you around?" Because randomcontact was offline, randomcontact's assistant responded with "Hi randomcontact2, this is randomcontact's electronic assistant. Randomcontact is not available right now, would you like to leave a message?" Randomcontact2 responded with "No thanks—do you know when he will be back?"

This instant message from randomcontact2 was received (405) and processed by natural language interface component 315. Natural language interface component 315 determined that this instant message contained a request for information regarding randomcontact's away or offline status.

In response, response component 320 determined the appropriate response (420) by accessing randomcontact's recent away or offline history, along with randomcontact's calendar information, and determine that randomcontact is in a meeting until 2 p.m. and has another meeting at 3 p.m. Response component 320 also determined that randomcontact normally comes online in-between meetings.

As a result, response component sent a message back (425) saying "he is in a meeting until 2 p.m. and then has another meeting at 3 p.m., so I would try sometime between 2-3 p.m." Randomcontact2 then responded with a message stating "Ok, thanks."

Figure 5C:
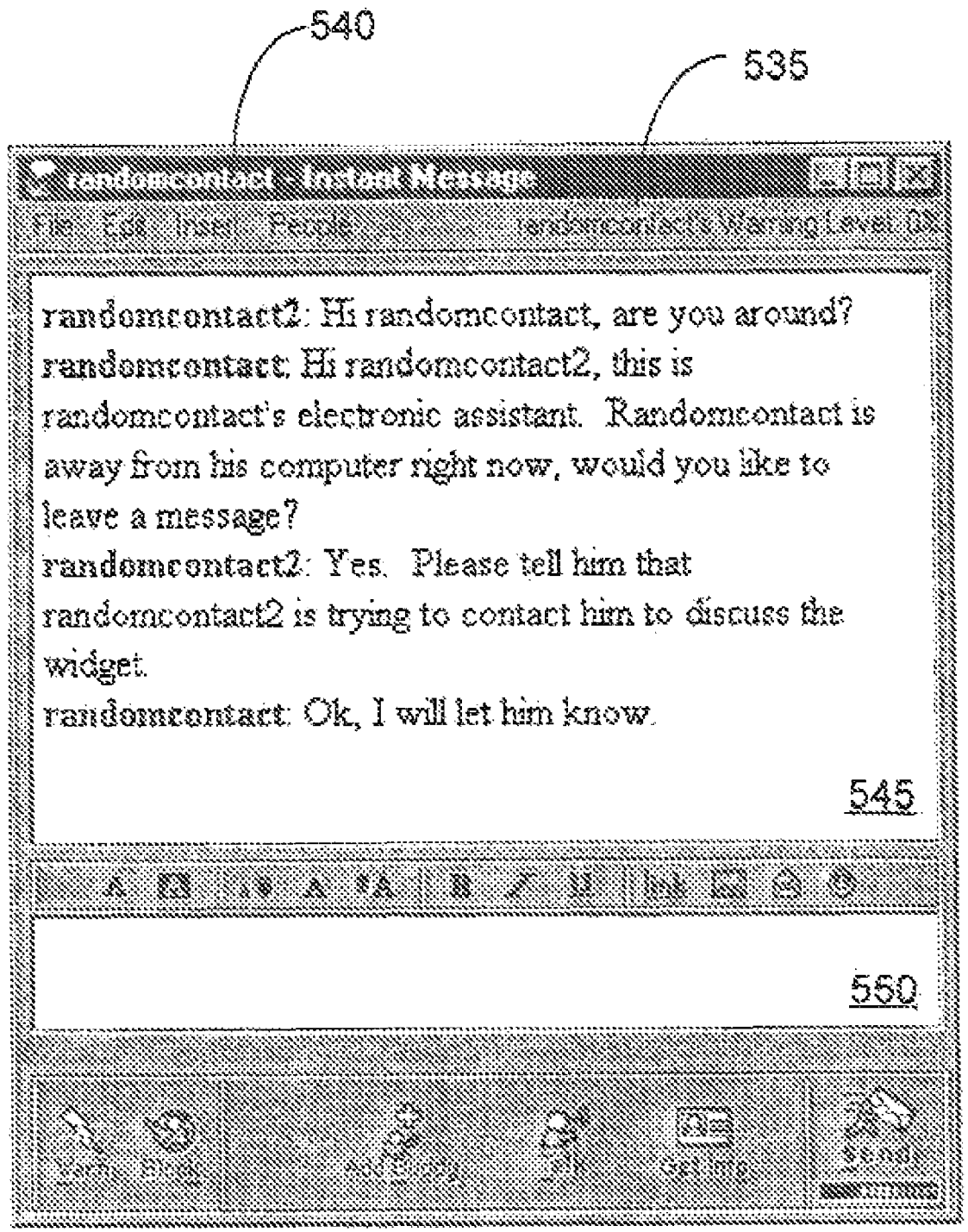

Referring to FIG. 5C, randomcontact2 sent an instant message to randomcontact saying "Hi randomcontact, are you around?" Because randomcontact was away, randomcontact's assistant responded with "Hi randomcontact2, this is randomcontact's electronic assistant. Randomcontact is away from his computer right now, would you like to leave a message?" Randomcontact2 responded with "Yes. Please tell him that randomcontact2 is trying to contact him to discuss the widget."

This instant message from randomcontact2 was received (405) and processed by natural language interface 315. Natural language interface 315 determined that this instant message indicated that randomcontact2 wanted to leave a message and that the instant message contained the message (415).

In response, response component 320 determined the appropriate response (430): "Ok, I will let him know." At this point, message processing component 325 determined when and to where to forward the message (if at all) (440) and forwarded the message appropriately (445). For example, message processing component 325 may have determined that randomcontact was likely to be back or log on from a different client system soon. Message processing component 325, therefore, held on to the message to deliver the message to the user as an instant message when the user can back from being away or logged on using a different client system.

Figure 5D:
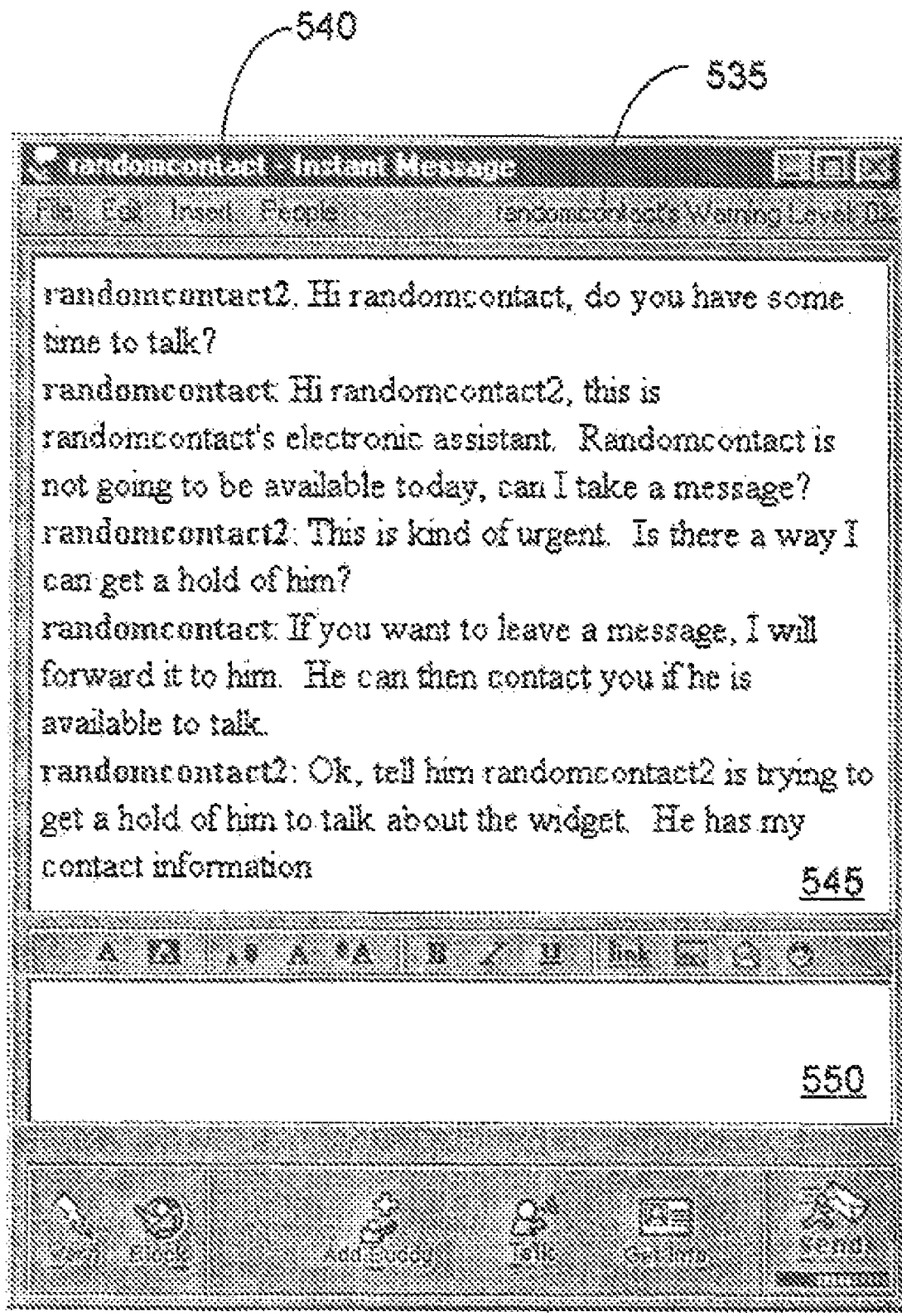

Referring to FIG. 5D, randomcontact2 sent an instant message to randomcontact say "Hi randomcontact, do you have some time to talk?" Because randomcontact was offline and, according to randomcontact's calendar, will not be back online that day, randomcontact's assistant responded with "Hi randomcontact2, this is randomcontact's electronic assistant. Randomcontact is not going to be available today, would you like to leave a message?" Randomcontact2 responded with "This is kind of urgent. Is there a way I can get a hold of him?"

This instant message from randomcontact2 was received (405) and processed by natural language interface component 315. Natural language interface component 315 determined that this instant message was requesting information concerning randomcontact's away or offline status.

Response component 320 then determined the appropriate response (420) to this inquiry, which was to offer to take a message. Response component 320 then sent a response (425) offering to forward a message to randomcontact2: "If you want to leave a message, I will forward it to him. He can then contact you if he is available to talk." In response, randomcontact2 left the message: "Ok, tell him randomcontact2 is trying to get a hold of him to talk about the widget. He has my contact information."

This instant message from randomcontact2 was received (405) and processed by natural language interface 315. Natural language interface component 315 determined that this instant message indicated that randomcontact2 wanted to leave a message and that the instant message contained the message (415).

In response, response component 320 sent a response (430): "Ok, I will let him know." (not shown). At this point, message processing component 325 determined when and to where to forward the message (if at all) (440) and forwarded the message appropriately (445).

Because randomcontact2 indicated the message was urgent, message processing component 325 may try the most immediate way of contacting randomcontact, for example, by calling randomcontact's cellular phone and conveying the message left by randomcontact2. Whether urgent or not, the mode of delivery selected by message component 325 may be determined with reference to rules established by or adopted for the intended recipient relating to the sender or sender type (e.g., family member vs. co-worker vs. unclassified), as well as other criteria such as time of day. The message may be conveyed, for example, by performing a text to speech conversion.

In some implementations, assistant 305 may recognize varying levels of trust when responding to requested actions. In other words, assistant 305 may assess whether the message initiator is trusted, and the extent to which the message initiator is trusted, before providing information or forwarding messages. For example, only message initiators at a particular trusted level may receive calendar information or more specific information about the intended recipient's away or offline history. That is, a message initiator below a certain trust level may only be told when the intended recipient is expected back, while assistant 305 may, for example, inform a more trusted message initiator when the intended recipient is normally available or when the intended recipient is in a meeting. A message initiator at an even higher level of trust also may be given a current cellular phone number, or other personal information.

Any number of methods may be used for designating another user as trusted and the user's level of trust. For example, a buddy may be considered at a certain level of trust if the buddy is in a specific group of the buddy list, or there may be a specific interface for designating buddies as trusted.

Assistant 305 also may be able to provide a return receipt (call back) to the message initiator when a message is delivered to the intended recipient. That is, the assistant 305 may be able to send an acknowledgement, through, for example, an instant message or an e-mail, when the intended recipient receives the message left by the message initiator. Similarly, assistant 305 also may be able to indicate whether a message was received if, for example, the message initiator sends an instant message to the assistant 305 and asks if the message was received.

While components 315, 320, and 325 have been described as separate components, these should be viewed as logical components. Thus, the components, 315, 320, and 325 do not have to be implemented as separate components, but instead some or all of them may be integrated with each other or other components.

The methods and processes described may be implemented as computer programs that are executed on a device comprising at least one processor and at least one data storage system (e.g., programmable computer, cellular phone, or personal digital assistant). The data storage system may be any type of storage medium or device usable with a processor (e.g., CD-ROM, RAM, or magnetic disk). The programs may be implemented in a high-level programming language and may also be implemented in assembly or other lower level languages, if desired.

Any such program will typically be stored on a computer-usable storage medium or device (e.g., CD-ROM, RAM, or magnetic disk). When read into the processor of the computer and executed, the instructions of the program cause the programmable computer to carry out the various operations described.

Furthermore, while the techniques have been described primarily with IM applications, they may be applied to other messaging programs such as e-mail programs or voice-over-IP (VoIP) or other telephone programs.

A number of implementations have been described. Nevertheless, it will be understood that various modifications may be made. Accordingly, other implementations are within the scope of the following claims.

What is claimed is:

1. A method of handling electronic messages sent to an away or offline user, the method comprising:

monitoring online habits of the away or offline user, the monitoring comprising monitoring use by the away or offline user of more than one electronic messaging medium relative to one another;

based on the monitoring, deriving a pattern of away or offline status of the away or offline user;

storing, in electronic storage, information that describes the pattern of away or offline status of the away or offline user;

receiving one or more electronic messages sent from a first user to the away or offline user;

in response to receiving the one or more electronic messages, accessing, from electronic storage, the information that describes the derived pattern of away or offline status of the away or offline user;

determining, by at least one computer, an action to be taken in response to the one or more electronic messages based on the pattern of away or offline status of the away or offline user described by the accessed information; and performing the action to be taken, wherein monitoring use by the away or offline user of more than one electronic messaging medium relative to one another comprises monitoring use by the away or offline user of an electronic mail system relative to when the away or offline user is logged in to an instant messaging network;

wherein deriving the pattern of away or offline status of the away or offline user comprises deriving a pattern of when the away or offline user is expected to check electronic mail using the electronic mail system after the user logs out of the instant messaging network;

wherein determining the action to be taken in response to the one or more electronic messages based on the pattern of away or offline status of the away or offline user described by the accessed information comprises determining a response to the one or more electronic messages that indicates when the away or offline user is expected to check electronic mail using the electronic mail system based on the derived pattern of when the away or offline user is expected to check electronic mail using the electronic mail system after the user logs out of the instant messaging network; and wherein performing the action to be taken includes transmitting the response to the first user as an electronic message.

2. The method of claim 1:

wherein monitoring use by the away or offline user of an electronic mail system further comprises monitoring when the away or offline user last sent an electronic mail message using the electronic mail system; and wherein deriving the pattern of away or offline status of the away or offline user comprises deducing whether electronic mail messages recently received using the electronic mail system are being read by the away or offline user based on when the away or offline user last sent an electronic mail message using the electronic mail system.

3. The method of claim 1:

wherein monitoring use by the away or offline user of an electronic mail system further comprises monitoring when the away or offline user typically reads and sends electronic mail messages using the electronic mail system; and wherein deriving the pattern of away or offline status of the away or offline user comprises deriving a pattern of when the away or offline user typically reads and sends electronic mail messages using the electronic mail system.

4. The method of claim 1 wherein determining the response to the one or more electronic messages that indicates when the away or offline user is expected to check electronic mail using the electronic mail system and transmitting the response are conditioned on the one or more electronic messages asking whether the away or offline user will receive a recently sent electronic mail message.

5. The method of claim 1:
   wherein monitoring use by the away or offline user of an electronic mail system further comprises monitoring for content mentioned in electronic mail messages exchanged by the away or offline user using the electronic mail system; and
   wherein deriving the pattern of away or offline status of the away or offline user comprises deriving information about the away or offline user's activities based on the content mentioned in electronic mail messages exchanged by the away or offline user using the electronic mail system.

6. The method of claim 1 further comprising performing natural language processing on the one or more electronic messages to determine whether the one or more electronic messages include a request for information related to a status of the away or offline user or whether the one or more electronic messages are related to leaving a message for the away or offline user,
   wherein determining the action to be taken and performing the action to be taken comprises:
      in response to a determination that the one or more electronic messages include a request for information related to a status of the away or offline user, determining an appropriate response to the request for information related to the status of the away or offline user and transmitting the appropriate response to the first user as an electronic message; and
      in response to a determination that the one or more electronic messages are related to leaving a message for the away or offline user, accessing a message for the away or offline user from the first user and delivering the accessed message to the away or offline user.

7. The method of claim 6 wherein determining an appropriate response to the request for information related to the status of the away or offline user comprises:
   accessing stored calendar information for the away or offline user;
   accessing stored information about other ways of contacting the away or offline user;
   accessing stored information about recent history of the away or offline status of the away or offline user; and
   determining an appropriate response to the request for information related to the status of the away or offline user based on the accessed calendar information for the away or offline user, the accessed information about other ways of contacting the away or offline user, and the accessed information about recent history of the away or offline status of the away or offline user.

8. The method of claim 6 wherein accessing a message for the away or offline user from the first user comprises:
   sending, to the first user, a reply to the one or more electronic messages indicating an ability to receive a message for the away or offline user from the first user and describing how the first user may deposit the message for the away or offline user; and
   receiving, from the first user, the message for the away or offline user in response to the reply.

9. The method of claim 6 wherein accessing a message for the away or offline user from the first user comprises:
   determining whether the one or more electronic messages include the message for the away or offline user from the first user; and
   in response to a determination that the one or more electronic messages include the message for the away or offline user from the first user:
      accessing the message for the away or offline user from the one or more electronic messages; and
      sending, to the first user, a reply to the one or more electronic messages acknowledging that the message for the away or offline user has been received and is being delivered to the away or offline user.

10. The method of claim 6:
   wherein receiving one or more electronic messages sent from a first user to the away or offline user comprises receiving the one or more electronic messages using a first communication mechanism;
   wherein performing natural language processing on the one or more electronic messages to determine whether the one or more electronic messages include a request for information related to a status of the away or offline user or whether the one or more electronic messages are related to leaving a message for the away or offline user comprises determining that the one or more electronic messages indicate that the first user wants to leave a message for the away or offline user using a second communication mechanism that is different than the first communication mechanism through which the one or more electronic messages were received; and
   wherein accessing a message for the away or offline user from the first user comprises:
      determining whether the second communication mechanism is available to accept a message for the away or offline user;
      in response to a determination that the second communication mechanism is unavailable to accept a message for the away or offline user, sending, to the first user, a reply to the one or more electronic messages indicating that the second communication mechanism is unavailable; and
      in response to a determination that the second communication mechanism is available to accept a message for the away or offline user:
         sending, to the first user, a reply to the one or more electronic messages indicating an ability to accept a message through the second communication mechanism; and
         receiving, from the first user, the message for the away or offline user using the second communication mechanism in response to the reply indicating an ability to accept a message through the second communication mechanism.

11. The method of claim 6 wherein delivering the accessed message to the away or offline user comprises:
   determining at least one message forwarding parameter describing a message forwarding location and a message forwarding time for the accessed message to the away or offline user; and
   causing the accessed message to be forwarded to the away or offline user in accordance with the at least one messaging forwarding parameter.

\* \* \* \* \*